US012515360B2

(12) United States Patent
Iaccarino et al.

(10) Patent No.: US 12,515,360 B2
(45) Date of Patent: Jan. 6, 2026

(54) COMB FOR A HAIR CUTTING DEVICE

(71) Applicant: KONINKLIJKE PHILIPS N.V., Eindhoven (NL)

(72) Inventors: Luca Iaccarino, Groningen (NL); Roel Alexander Rethmeier, Drachten (NL); Albert Jan Aitink, Drachten (NL); Hendrik Klaas Paauw, Roden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 142 days.

(21) Appl. No.: 18/685,368

(22) PCT Filed: Aug. 26, 2022

(86) PCT No.: PCT/EP2022/073769

§ 371 (c)(1),
(2) Date: Feb. 21, 2024

(87) PCT Pub. No.: WO2023/031034

PCT Pub. Date: Mar. 9, 2023

(65) Prior Publication Data

US 2024/0351228 A1 Oct. 24, 2024

(30) Foreign Application Priority Data

Aug. 31, 2021 (EP) .................................... 21194050

(51) Int. Cl.
*B26B 19/20* (2006.01)
*B26B 19/06* (2006.01)

(52) U.S. Cl.
CPC .............. *B26B 19/20* (2013.01); *B26B 19/06* (2013.01)

(58) Field of Classification Search
CPC ...... B26B 19/06; B26B 19/20; B26B 19/3806
(Continued)

(56) References Cited

U.S. PATENT DOCUMENTS 2,187,599 A 1/1940 Cromonic
3,041,726 A 7/1962 Hitson
(Continued)

FOREIGN PATENT DOCUMENTS

CN 110125989 A 8/2019
CN 210389268 U 4/2020
(Continued)

OTHER PUBLICATIONS

International Search report and Written Opinion of PCT/EP2022/073769 dated Nov. 30, 2022.

*Primary Examiner* — Sean M Michalski
*Assistant Examiner* — Robert D Cornett

(57) ABSTRACT

There is described a hair comb (200) for a hair cutting device (100) which seeks to provide consistent improved hair lifting and guidance. The hair comb (200) has a plurality of comb teeth (302), wherein at least one of the comb teeth has a depression on a guard-facing surface (214) opposite a skin-contact surface (216). The depression defines a space for receiving a guard tooth (116) of the cutting device (100). The hair comb (200) is configured to cooperate with the cutting head (102) such that, when the hair comb (200) is attached to the cutting head (102): at least a distal end (404) of a guard tooth (116) is received in the space defined by the depression (402) to engage the at least one comb tooth (302).

13 Claims, 9 Drawing Sheets

(58) Field of Classification Search
USPC ...................... 30/200, 233, 233.5; 132/213.1
See application file for complete search history.

(56) References Cited

U.S. PATENT DOCUMENTS

| | | | | |
|---|---|---|---|---|
| 3,344,520 | A | 10/1967 | Williams | |
| 10,702,999 | B2 * | 7/2020 | Iaccarino | B26B 19/063 |
| 2009/0113722 | A1 | 5/2009 | Werner et al. | |
| 2013/0219724 | A1 | 8/2013 | Werner | |
| 2017/0266823 | A1 | 9/2017 | Whittaker et al. | |
| 2017/0355088 | A1 * | 12/2017 | Kim | B26B 19/3846 |
| 2021/0008740 | A1 | 1/2021 | Iaccarino et al. | |

FOREIGN PATENT DOCUMENTS

| | | | |
|---|---|---|---|
| CN | 111168724 | A | 5/2020 |
| EP | 2055449 | A1 | 5/2009 |
| EP | 3381629 | A1 | 10/2018 |

* cited by examiner

COMB FOR A HAIR CUTTING DEVICE

CROSS-REFERENCE TO PRIOR APPLICATIONS

This application is the U.S. National Phase application under 35 U.S.C. § 371 of International Application No. PCT/EP2022/073769, filed on Aug. 26, 2022, which claims the benefit of European Patent Application No. 21194050.7 filed on Aug. 31, 2021. These applications are hereby incorporated by reference herein.

FIELD OF THE INVENTION

The present invention relates to combs for hair cutting devices and hair cutting systems comprising hair cutting devices and combs.

BACKGROUND OF THE INVENTION

Hair cutting devices, such as clippers or electric shavers, are widely used to cut body hair and typically include a handle and a cutting head. The cutting head usually comprises a movable inner cutting member which reciprocates with respect to an outer guard member to perform a cutting operation. The outer guard member comprises a main body and a plurality of guard teeth extending from the main body in side-by-side relationship, and the inner cutting member is provided with a plurality of blade teeth arranged in side-by-side relationship for cooperation with the guard teeth. In use, hairs that are received between adjacent guard teeth are cut by the inner cutting member with a scissor-like action.

In order to guide hairs to the cutting region, hair cutting devices are sometimes provided with a hair comb which lifts and guides hairs to the cutting region as the comb is moved over the skin. A hair comb typically comprises a base which attaches to the cutting device. Extending from the base are a plurality of comb teeth for guiding hairs to the cutting region. A comb tooth comprises a skin-contact surface for sliding along the skin of the user during a cutting stroke. On the opposite side of the comb tooth to the skin-contact surface is a guard-facing surface which faces the guard member when the comb is attached to the cutting device. When the comb is attached to the cutting device, the guard teeth abut the guard-facing surfaces to provide a predetermined spacing between the skin and the blade teeth in order to define a remaining length of the hairs after cutting (i.e. a hair cutting length).

EP 3 381 629 A1 discloses a comb a for a hair cutting appliance. The comb comprising a comb piece that is arranged to be disposed at a skin-facing side of a stationary blade of a blade set, the comb piece comprising a plurality of comb teeth that define a cutting length of the blade set when the comb arrangement is mounted to the blade set. Further the comb piece comprises a flexure section that is arranged to urge a frontal portion of the comb piece against the skin-facing side of the stationary blade.

A problem with such combs, however, is that the stiffness of the comb teeth is limited by the small geometric shape and volume that is necessary to adequately manipulate and guide hairs to the cutting region. The comb teeth are often flexible and can be displaced from their intended positions with respect to the guard teeth. For example, the comb teeth can displace laterally, in a direction along which the comb teeth are spaced apart. This not only lowers the overall robustness and quality of the hair comb, but also its ability to consistently and uniformly lift and guide hairs to the cutting region.

It would be advantageous to provide a hair comb for a hair cutting device which provides consistent improved hair lifting and guidance. It would also be desirable to provide a hair comb with increased robustness.

SUMMARY OF THE INVENTION

To better address one or more of the concerns above, in a first aspect of the invention, there is provided a hair comb for attaching to a cutting head of a hair-cutting device, the cutting head having an inner cutting member and an outer guard member comprising a main body and a plurality of guard teeth extending from the main body in side-by-side relationship. The hair comb comprises: a support body for attachment to the cutting head; and a plurality of comb teeth that extend longitudinally from the support body in side-by-side relationship. At least one (and in some embodiments each) comb tooth of the plurality of comb teeth comprises: a skin-contact surface and a guard-facing surface opposite the skin-contact surface, wherein the guard-facing surface has a depression which defines a space for receiving a distal end of a guard tooth when the hair comb is attached to the cutting head. The depression extends lengthwise in a longitudinal direction of the comb tooth. In this way, the depression restricts lateral movement of the comb tooth with respect to the guard tooth when the hair comb is attached to the cutting head. In addition, or alternatively, this arrangement prevents the distal end of the guard tooth from forming part of a hair guiding interface. When in use the hair comb is attached to the cutting head, or in other words: is in an engaged state, the guard tooth and the at least one comb tooth will have an outer profile which defines the hair guiding interface for directing hairs to the inner cutting member.

In a second aspect of the invention, there is provided a hair-cutting system, comprising: a hair-cutting device comprising a cutting head having an inner cutting member and an outer guard member, wherein the outer guard member comprises a main body and a plurality of guard teeth extending from the main body in side-by-side relationship; and a hair comb as described above in the preceding statement. The hair comb is configured to cooperate with the cutting head such that, when the hair comb is attached to the cutting head: at least a distal end of a guard tooth is received in the space defined by the depression on the guard-facing surface to engage the at least one comb tooth.

By receiving a distal end of a guard tooth in the space defined by the depression on the guard-facing surface of the comb tooth, the distal end will be bounded (in at least one direction) by comb tooth material (i.e. the sides of the depression) such that relative movement between the comb tooth and the guard tooth will be restricted, and in some embodiments prevented. There may be a gap between the guard tooth and one or more sides of the depression, in which case the comb tooth may be allowed to displace by a distance corresponding to the size of that gap, until one of the sides of the depression abuts the guard tooth to prevent further movement. In other embodiments, the guard tooth may be received snugly in the space between the two sides of the depression, to substantially prevent movement of the comb tooth relative the guard tooth when in the engaged state. In this way, the overall robustness and quality of the hair comb may be improved, and also its ability to consistently and uniformly lift and guide hairs to the cutting region.

Further, the Applicant has recognised that another problem with many hair combs is that hairs received between adjacent comb teeth can fall onto the guard-facing surfaces at a location that is forwards of the guard teeth in the direction of a hair cutting stroke, such that the distal ends of the guard teeth from the main body will collide with those hairs and cause them to be pushed away from the cutting region. In adjustable-length hair combs, where the comb teeth are able to translate with respect to the cutting head to adjust a hair cutting length, this problem is exacerbated because a larger area of the guard-facing surfaces may be exposed and, consequently, more hairs can be pushed out by collision with the guard teeth. This adversely affects the comb's ability to catch and transport hairs into the cutting spaces between guard teeth and correspondingly can lead to an uneven and incorrect hair length end result.

When in an engaged state, the guard tooth and the at least one comb tooth will have an outer profile which defines a hair guiding interface for directing hairs to the inner cutting member. However, by receiving the distal end of a guard tooth in the space defined by the surface depression on the guard-facing surface, the outer profile may be reduced as compared to hypothetical arrangements in which the guard-facing surface does not have a depression and the guard tooth simply rests on the guard-facing surface. The distal end of the guard tooth may have a height which is defined between an inner surface and an outer surface of the guard member and the depression may have a depth such that, when the hair comb is attached to the cutting head, at least some of the height of the distal end is received in the space defined by the depression and is prevented from forming part of the hair guiding interface.

The hair comb may be a single-piece hair comb which defines a fixed hair cutting length when attached to the cutting head. In other embodiments, the hair comb may be an adjustable length hair comb having two moveable parts. In that case, the hair comb may comprise: a first member for fixed attachment to the cutting head; and a second member which comprises the support body and the plurality of comb teeth; wherein the at least one comb tooth is wedge-shaped in that a height between the guard-facing surface and the skin-contact surface tapers towards a distal end of the at least one comb tooth from the support body; and wherein the second member is moveably connected to the first member to allow the comb teeth to translate with respect to the first member in a first direction; whereby, in use, translation of the comb teeth in the first direction causes the distal end of the at least one comb tooth to move forwards of the guard teeth in a cutting direction to adjust a spacing between a skin of a user and the inner cutting member in order to define a hair cutting length.

The depression may have any size or shape suitable for receiving and bounding a guard tooth. The guard-facing surface may have a depression comprising a groove. The groove may be a depression having two side walls that extend lengthwise and which define a space for receiving a guard tooth therebetween. The groove extends lengthwise in a longitudinal direction of the comb tooth. In this way, the groove (specifically the side walls) restricts lateral movement of the comb tooth.

The groove extends lengthwise in the first direction. This may help to restrict lateral movement of the comb tooth while allowing translation of the comb tooth to adjust a hair cutting length. It may in addition or alternatively help to hide the distal end of the guard tooth, to prevent the guard tooth forming part of the hair guiding interface, at multiple hair cutting length settings.

The depression may have a depth such that, when the hair comb is attached to the cutting head, at least 50% of the height of the distal end may be received in the space defined by the depression and is prevented from forming part of the hair guiding interface.

The depression may have a lateral extent (e.g. between two sides thereof), in a direction along which the plurality of comb teeth are spaced apart, such that the guard tooth and the at least one comb tooth engage to restrict lateral movement of the comb tooth. This may further improve robustness of the hair comb, as the comb teeth tend to flex laterally. Further, by restricting lateral movement of the comb tooth, a uniform number of hairs may be distributed between adjacent comb teeth and thus guided to a cutting edge of the cutting device. This can improve the hair cutting result.

The lateral extent of the depression may be equal to a thickness of the guard tooth in the lateral direction. This may restrict lateral movement of the comb tooth to a greater extent.

A thickness of the guard tooth in a lateral direction, along which the guard teeth are spaced apart, may be tapered towards the distal end of the guard tooth. A lateral extent of the depression may taper towards a bottom of the depression. This may restrict lateral movement of the comb tooth to a greater extent.

The depression may have a V-shaped profile in cross-section. The depression may instead have a U-shaped profile in cross-section.

The hair comb may be configured to co-operate with the cutting head such that, when the hair comb is attached to the cutting head, at least the distal end of the guard tooth is inclined with respect to the guard-facing surface such that a distal tip of the guard tooth points towards the depression.

BRIEF DESCRIPTION OF THE DRAWINGS

Exemplary embodiments will now be described, by way of example only, with reference to the following drawings, in which.

DETAILED DESCRIPTION OF THE EMBODIMENTS

Referring to FIGS. 1-8, there is generally shown a hair cutting system 10 comprising a hair cutting device, which is in the form of a hair clipper 100, and a hair comb 200. Although the FIGS. show a hair clipper specifically, it will be appreciated that the invention is applicable more generally to any known type of cutting device having an inner cutting member and an outer guard member, such as an electric shaver.

Figure 1:
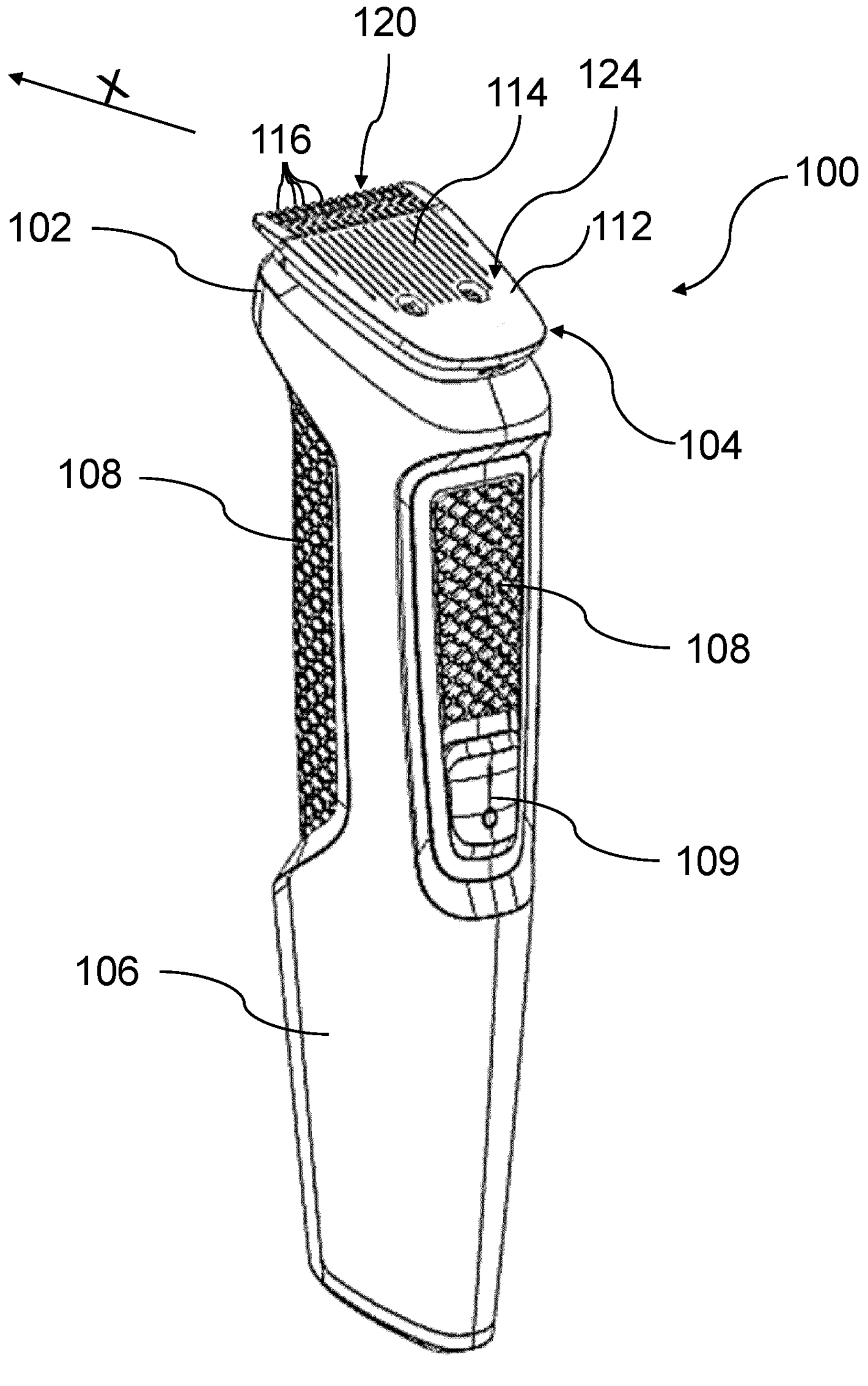
FIG. 1 is a perspective view of a hair cutting device, specifically a hair clipper.
Figure 2:
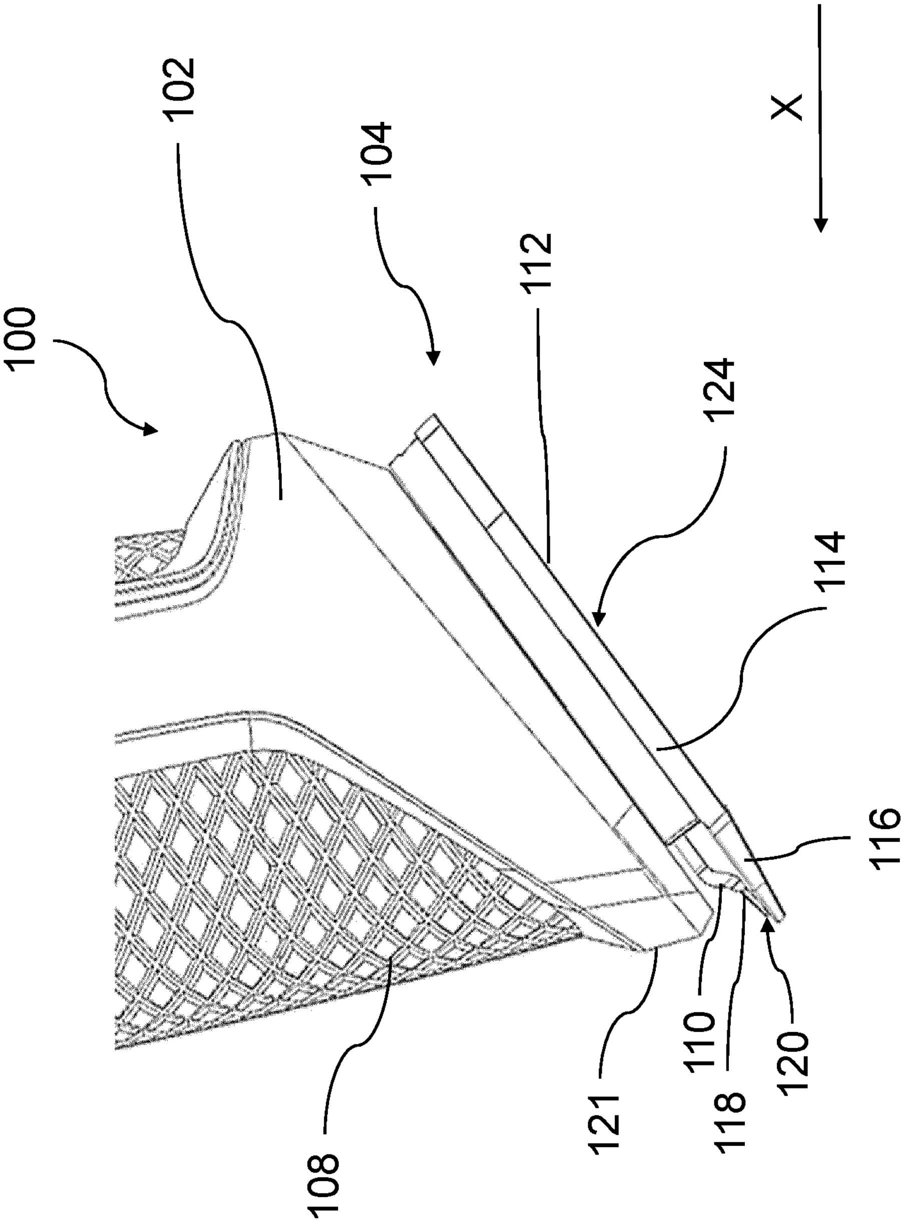
FIG. 2 is a lateral view of the hair clipper of FIG. 1.

Referring to FIGS. 1 and 2, which show the hair clipper 100 by itself, the hair clipper 100 comprises a clipper body having a cutting head 102 on which a cutting element 104 is attached and a handle portion 106 which generally extends away from the cutting head 102. The clipper body is generally formed by a housing which forms the external surface of the clipper body.

The handle portion 106 is an elongate grippable portion by which a user can grip the clipper 100 with their hand during use. The handle portion 106 is partially covered with a rubberised or textured surface 108 to facilitate better gripping of the clipper 100 by a user, particularly when the handle portion 106 is wet. On a rear face of the handle portion 106 a power button 109 is provided for powering the clipper 100 on/off.

The cutting head 102 is arranged at an end of the handle portion 106. The cutting head 102 comprises the cutting element 104 of the clipper 100. The cutting element 104 comprises a movable inner cutting member 110 which reciprocates with respect to a static outer guard member 112 to perform a cutting operation. The outer guard member 112, which may also be referred to as a stationary outer cutting member, comprises a main body 114 and a plurality of guard teeth 116 (which may themselves be bladed) extending from the main body 114 in side-by-side relationship, and the inner cutting member 110 is provided with a plurality of bladed teeth 118 arranged in side-by-side relationship for cooperation with the guard teeth 116.

Figure 5:
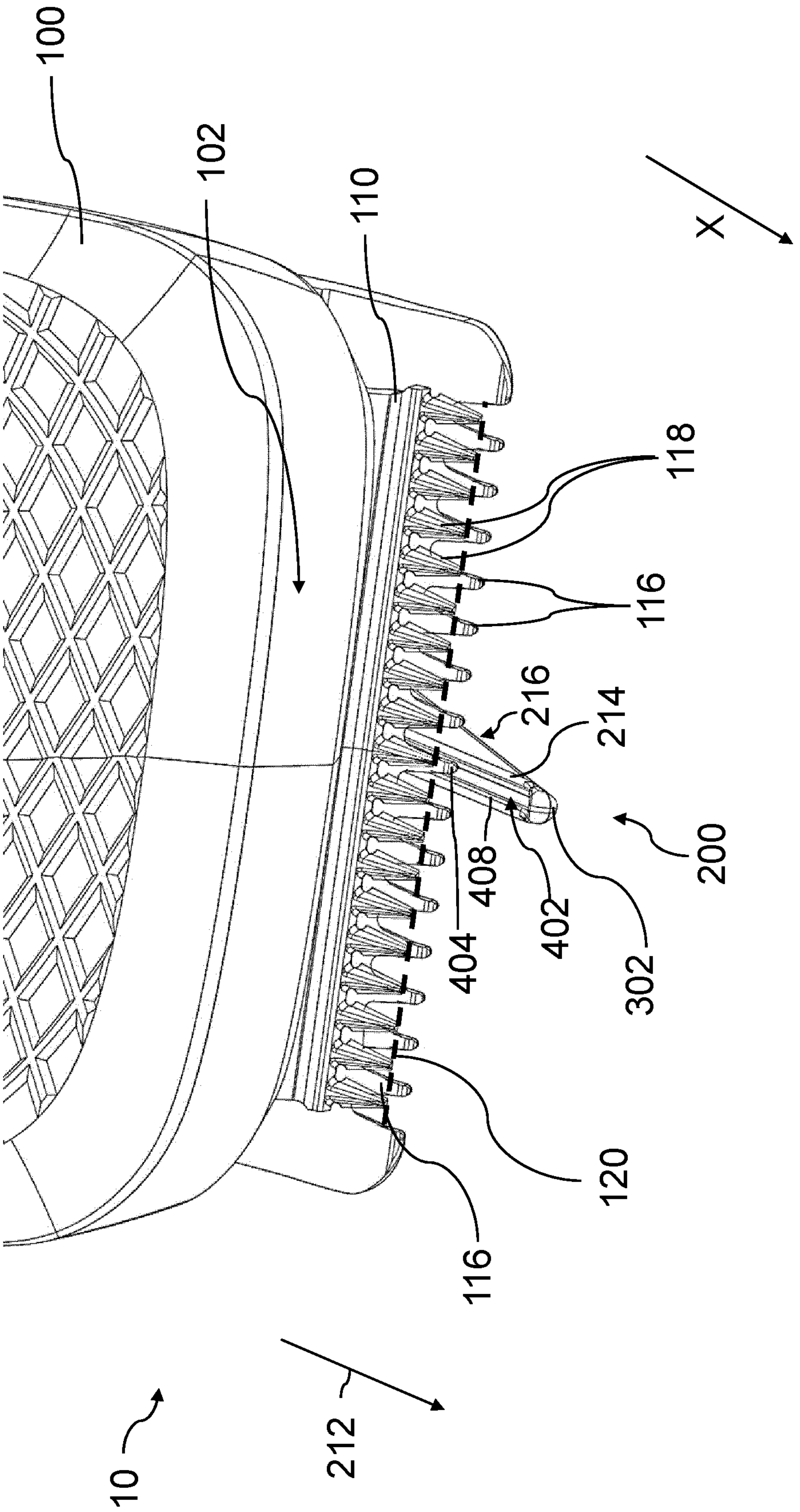
FIG. 5 is a simplified front perspective view of a part of the hair cutting system of FIG. 3, where only a single comb tooth of the hair comb is shown.

As best shown in FIG. 5, the bladed teeth 118 and the guard teeth 116 combine to form a cutting edge 120 (as illustrated by the dashed line in FIG. 5). The bladed teeth 118 are reciprocated laterally relative to the static guard teeth 116 in a direction parallel to the cutting edge 120, such that hairs positioned between the guard teeth 116 are cut with a scissor-like action as the bladed teeth 118 move past the guard teeth 116. The movable inner cutting member 110 may be reciprocated using a motor which powers a reciprocating mechanism (not shown) attached to the inner cutting member 110. The motor may be powered by a rechargeable battery contained within the body of the clipper 100. The motor can be selectively turned on and off using the power button 109.

The cutting edge 120 forms a front edge of the cutting head 102. A cutting direction x of the hair clipper 100 is normal to the cutting edge 120. It should be understood that in order for hairs to easily enter the gaps between the guard teeth 116 and bladed teeth 118, they must approach the cutting edge 120 from the front side of the cutting edge 120 parallel to the cutting direction x. Therefore, the hair clipper 100 cuts hair most effectively when moved forwards in the cutting direction x shown in FIG. 5.

Returning to FIGS. 1 and 2, an outer surface 124 of the outer guard member 112 which is rearward of the cutting edge 120 in the cutting direction x faces the skin (not shown) in use. In use, for a close shave without a comb attached to the clipper 100, the skin-facing outer surface 124 is generally pressed lightly against the user's skin, and the clipper 100 is slid along the user's skin in the cutting direction x, such that the cutting edge 120 moves forward along the user's skin in the cutting direction x, to cut any hairs that it encounters.

As best illustrated in FIG. 3, the system 10 also comprises a comb 200. The comb 200 guides and lifts hairs to be cut so that the cutting element 104 can cut them effectively and efficiently.

The comb 200 comprises a first member 202 and a second member 204. The first member 202 comprises a body for fixedly attaching to the outer guard member 112 of the clipper 100. To facilitate this, a connection feature in the form of a clip 206 extends from the rear of the body of the first member 202. The clip 206 comprises a flexible or spring-loaded protrusion, an end of which is shaped to engage with a lip 208 at the rear of the outer guard member 112 to hold the first member 202 to the outer guard member 112 in a fixed arrangement. The clip 206 forms a snap-fit connection to the outer guard member 112. The clip 206 further comprises a lever section 210 which can be pressed to undo the snap-fit and detach the first member 202 and thus the overall hair comb 200 from the outer guard member 112. Other known types of connection features are also possible.

The second member 204 comprises a support body 300 which is moveably connected to the body of the first member 202, to allow the second member 204 to translate with respect to the first member 202, and thus the cutting edge 120 of the clipper 100 when the first member 202 is attached to the cutting head 102. The second member 204 is configured to translate with respect to the first member 202 in a first direction 212 perpendicular to the cutting edge 120.

Figure 4:
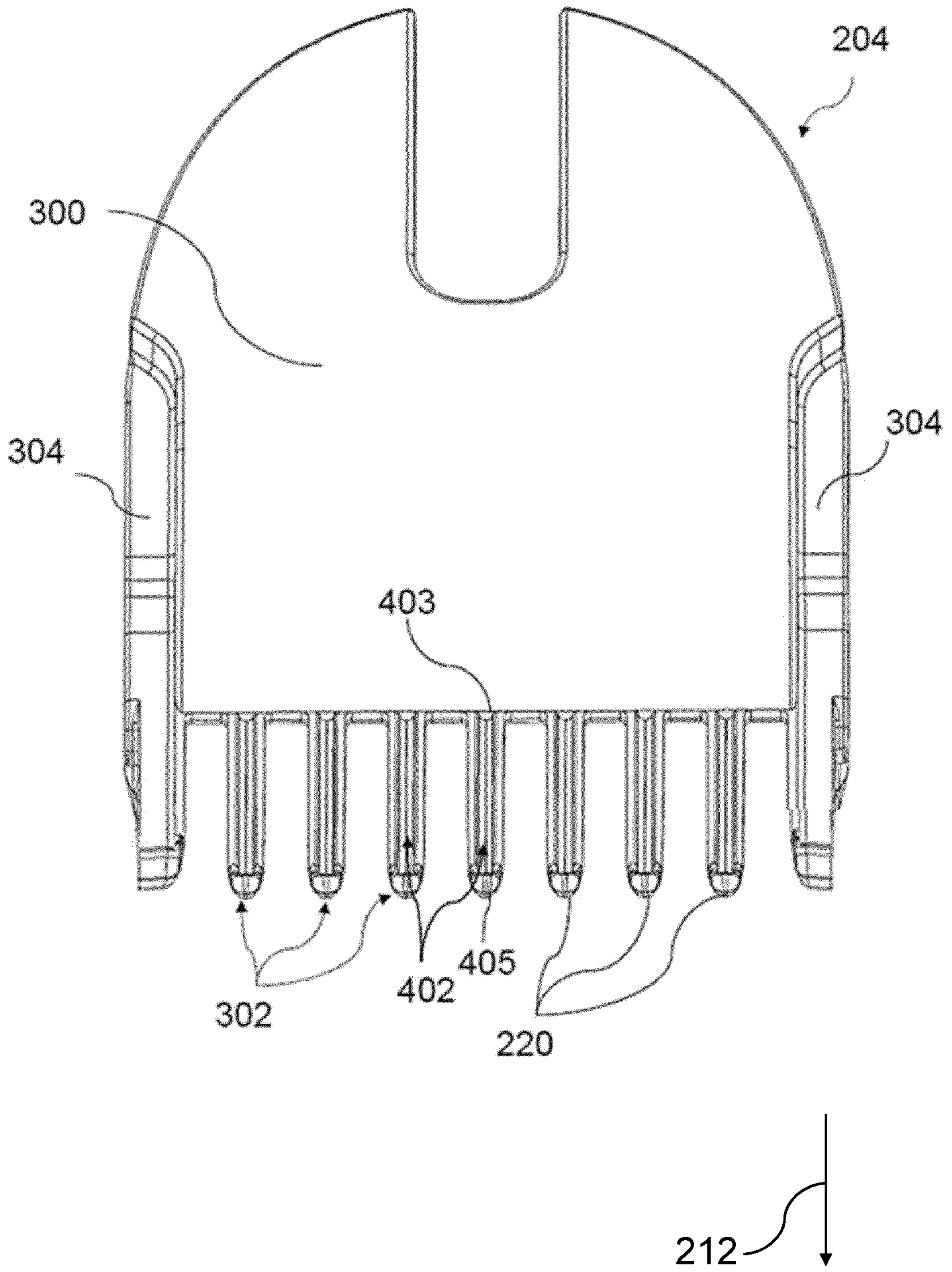
FIG. 4 is a top view of a part, specifically a movable member, of the adjustable hair comb of FIG. 3.

As best shown in FIG. 4, the second member 204 is configured to be moveably connected to the first member 202 in that it comprises two side elements 304 which run lengthwise in the first direction 212 on opposite, lateral sides of the support body 300. A lateral extent between the side elements 304 is substantially equal to the width of the first member 202 in the lateral direction, such that the first member 202 is able to be received between, and slide along, the side elements 304 of the second member 204 in the first direction 212. The first member 202 and the second member 204 may be movably connected via one or more rails incorporated into the first member 202 or the second member 204, e.g. along the side elements 304, or other mechanism which restricts relative movement to the first direction 212. The first direction 212 is normal to the cutting edge 120 and is, in use, parallel to the outer surface 124 of the outer guard member 112.

The support body 300 is a substantially continuous, e.g. planar, body having protrusions extending therefrom to form a plurality of comb teeth 302. Each one of the plurality of comb teeth 302 extends longitudinally from the support body 300 to a distal end 220 of the comb tooth 302 which is furthest from the support body 300 in the first direction and, in use, the cutting direction x. The comb teeth 302 are arranged in side-by-side relationship and are spaced apart along a lateral direction parallel to the cutting edge 120.

It will be appreciated that although the drawings show the comb teeth 302 extending from a substantially continuous and planar support body 300, this is not required. The support body 300 may be formed by strips that extend from a rear connecting bar in the cutting direction x, for example. Indeed, the hair comb 200 may have any shape or structure which is suitable for attachment to the cutting head 102 of the hair clipper 100 and which generally defines a plurality of comb teeth 302.

As best shown in FIG. 3, the comb teeth 302 generally extend in parallel directions substantially perpendicularly to the cutting edge 120 away from the support body 300 and towards the surface of the skin on which hairs to be cut are located. The comb teeth 302 extend forward of the guard teeth 116 and the housing of the clipper 100 in the cutting direction x and the first direction 212. Each one of the comb teeth 302 has a guard-facing surface 214 that extends at an obtuse angle, which is around 120 degrees, from a forward face 121 of the cutting head 102. During translation of the second member 204 relative the first member 202, the guard-facing surfaces 214 of the comb teeth 302 slide along the guard teeth 116, although contact between them is not necessary. Each one of the comb teeth 302 also has a skin-contact surface 216 opposite the guard-facing surface 214, where the skin contact surface 216 is for contacting and sliding along the skin of the user during a cutting stroke along cutting direction x.

The comb teeth 302 provide a predetermined spacing 218 between the skin of a user and the cutting edge 120 in order to define a hair cutting length, i.e., the length of the hairs after cutting. Further, the comb teeth 302 are substantially wedge shaped in that the height between the guard-facing surfaces 214 and the skin-contact surfaces 216 tapers towards the distal ends 220 of the comb teeth 302. Accordingly, during translation of the second member 204 along the first direction 212, the distal ends 220 of the comb teeth 302 move forwards of the guard teeth 116 and thus the cutting edge 120 in the cutting direction x, which is a horizontal direction parallel to the skin surface, to adjust the predetermined spacing 218 and thus the cutting length.

Figure 3A:
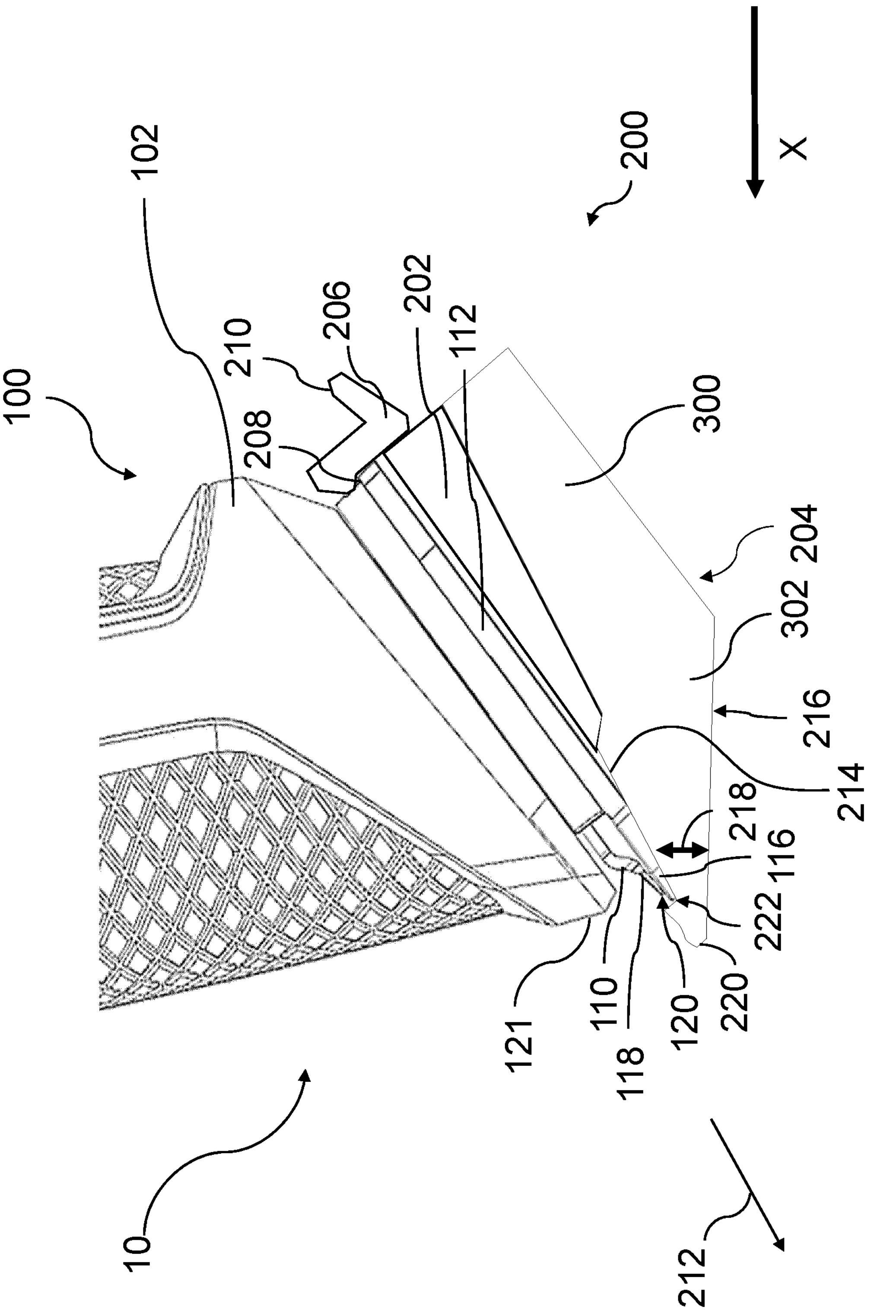
FIG. 3 includes two lateral views of a hair cutting system comprising the hair clipper of FIG. 1 and an adjustable length hair comb, where the two views show the hair comb in a fully retracted position and a fully extended position, respectively.
Figure 3B:
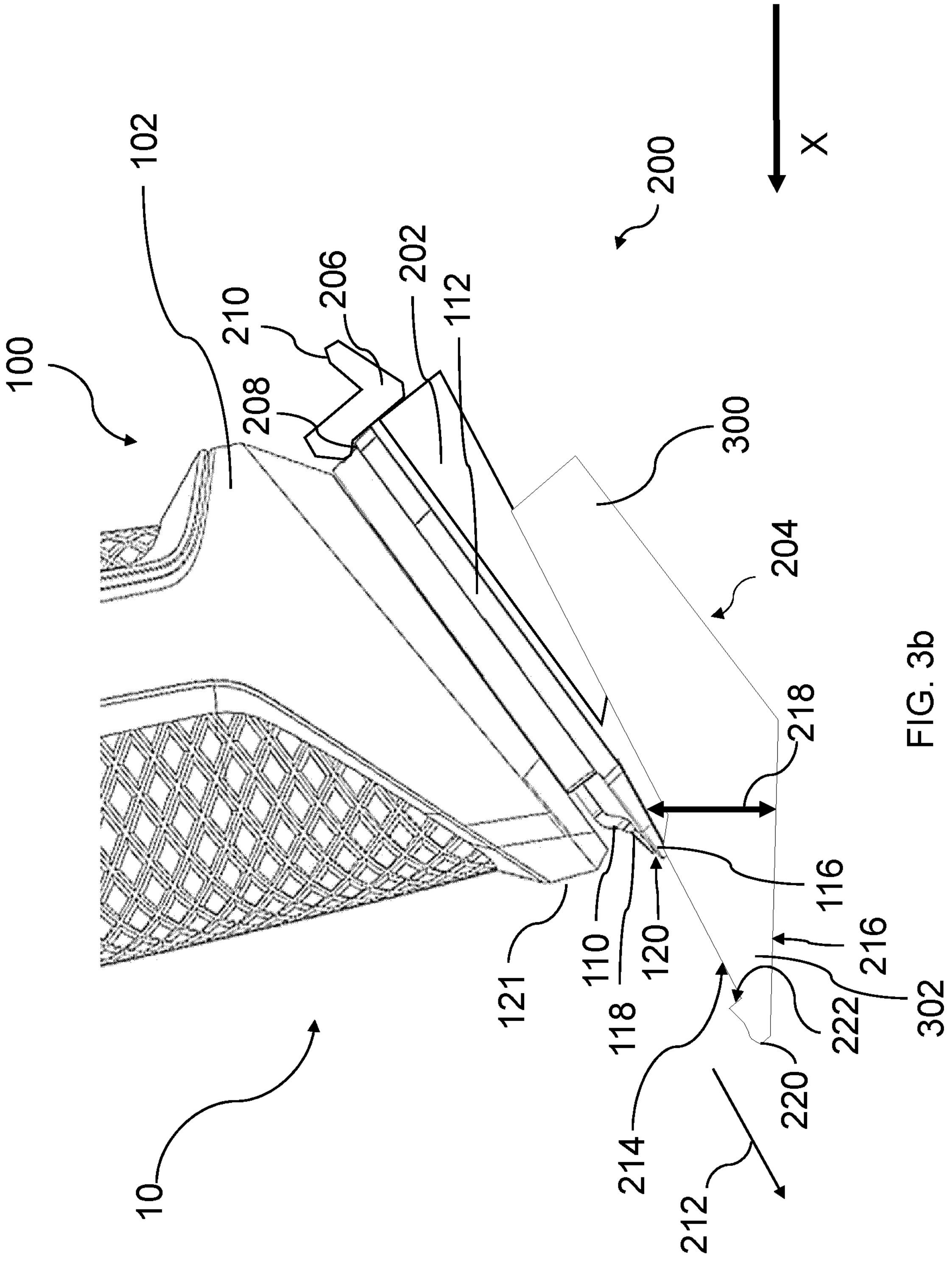

The second member 204 is moveable between a fully retracted position (as is illustrated in FIG. 3*a*), at which the distal ends of the guard teeth 116 are located at or abut distal regions of the comb teeth 302, and a fully extended position (FIG. 3*b*), at which the distal ends of the guard teeth 116 are located at or abut the comb teeth 302 at regions of the comb teeth 302 that are proximal the support body 300 of the second member 204. In the fully retracted position, the hair comb 200 is set to its shortest hair cutting length, whereas the hair comb 200 is set to its longest hair cutting length when in the fully extended position.

The distal ends 220 of the comb teeth 302 curve upwards at their forward ends (i.e. furthest from the support body 300 in the cutting direction x) away from the skin surface to define curved portions having rear facing surfaces 222 which face backwards in the cutting direction x. The rear facing surfaces 222 and the guard-facing surfaces 214 define a discontinuous shoulder configured to extend around the cutting element 104 and cutting edge 120 of the clipper 100 when the comb 200 is set to the fully retracted position (i.e. its shortest hair cutting length setting) as shown in FIG. 3*a*.

A part of the guard-facing surface 214 of one (in this embodiment each) of the comb teeth 302 is indented, sunk, or recessed back from a remaining area of the guard-facing surface 214 to form a surface depression. The surface depression defines a space which is bounded by comb material, including that of the remaining area of the guard-facing surface 214 of the comb tooth. The space is suitable for receiving a corresponding guard tooth 116 of the cutting head 102 and the hair comb 200 is configured to cooperate with the cutting head 102 such that, when the hair comb 200 is attached to the cutting head 102, at least a distal end of a guard tooth 116 is received within the space defined by the surface depression to engage the comb tooth 302.

In the present embodiment, the surface depression is in the form of a groove 402 which extends lengthwise in a longitudinal direction of the comb tooth 302 between a first end 403 proximate the support body 300 of the second member 204 and a second end 405 at the rear facing surface 222 proximate the distal end 220 of the comb tooth 302 from the support body 300. The groove 402 extends normal to the cutting edge 120 and parallel to the first direction 212 along which the second member 204 translates relative to the first member 202. In that regard, the guard teeth 116 slide within (but not necessarily in contact with, e.g. the internal surfaces of) the grooves 402 as the second comb member 204 translates relative the first comb member 202 to adjust a hair cutting length. In other embodiments, however, the groove may extend lengthwise in a lateral direction of the comb tooth 302, along which the comb teeth 302 are spaced apart. Further, the comb tooth 302 may have more than one such groove, where those grooves are located on the guard-facing surface 214 at distinct longitudinal positions away from the support body 300 of the second member 204, each distinct longitudinal positions corresponding to a different hair cutting length of the comb 200.

In the present embodiment, every other one of the guard teeth 116 in a lateral direction along which the guard teeth 116 are spaced is received in a groove 402 of a corresponding one of the comb teeth 302. To facilitate this, the pitch between adjacent comb teeth 302 (and grooves 402) in the lateral direction is equal to twice the pitch of adjacent guard teeth 116 in the lateral direction. Accordingly, when the comb 200 is attached to the cutting head 102 of the clipper 100, the grooves 402 will have the same lateral positions as (half of) the guard teeth 116, so that the guard teeth 116 will be received in those grooves 402.

Figure 6:
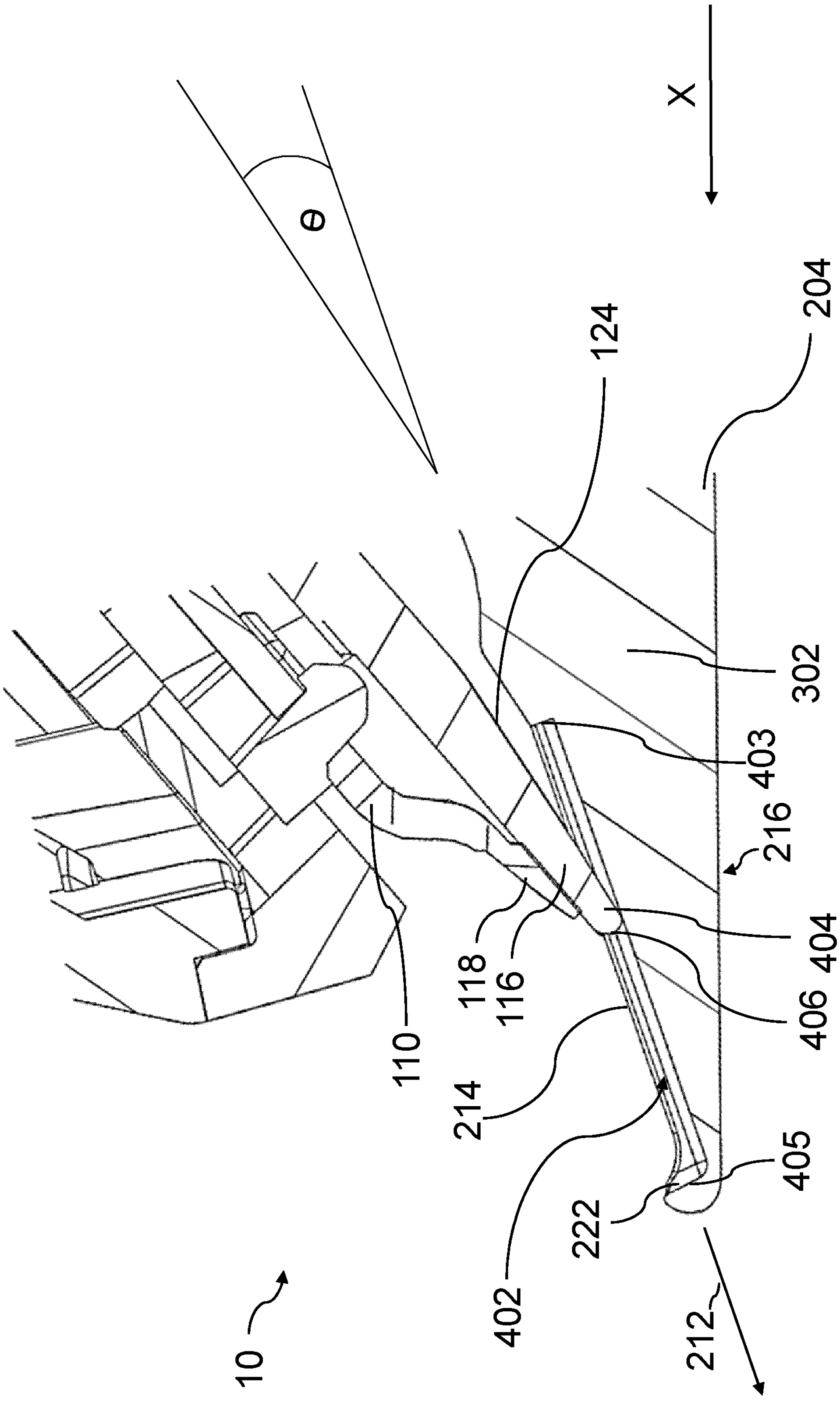
FIG. 6 is a cross-sectional view of a part of the hair cutting system of FIG. 3.

At least a distal end 404 of the guard tooth 116, which is the forwardmost region of the guard tooth 116 in the cutting direction x, is received in the groove 402. To facilitate this, and as best illustrated in FIG. 6, the hair comb 200 is configured to co-operate with the cutting head 102 such that, when the hair comb 200 is attached to the cutting head 102, the outer surface 124 of the outer guard member 112 at the distal end 404 is inclined at an angle, θ, with respect to the guard-facing surface 214 such that a front surface 406 or tip of the guard tooth 116 opposite the main body 114 points towards the groove 402. It will be appreciated here that the geometry and size of the comb 200 may be tailored and designed such that the front surface 406 will be oriented to point towards the groove 402 when the comb 200 is attached to the cutting head 102. For example, with reference to FIG. 3, the first member 202 of the comb 200 is substantially wedge shaped in that its thickness in a direction perpendicular to the cutting edge 120 and the first direction 212 tapers (reduces) towards the forwardmost end of the first member 202 in the cutting direction x. In other embodiments, however, the distal ends 404 of the guard teeth 116 may be inclined at an angle with respect to the main body 114 of the outer guard member 112, which is substantially planar, such that the front surface 406 will face the groove 402 when the comb 200 is attached to the cutting head 102. The distal ends 404 of the guard teeth 116 may point outwardly from the clipper body.

By receiving the guard teeth 116 in spaces formed by the depressions, the guard teeth 116 will engage the comb teeth 302 in a manner that at least partly restricts movement of the comb teeth 302. In this way, it may be possible to increase the overall robustness and quality of the hair comb 200, and consequently its ability to consistently and uniformly lift and guide hairs to the cutting element.

Figure 7:
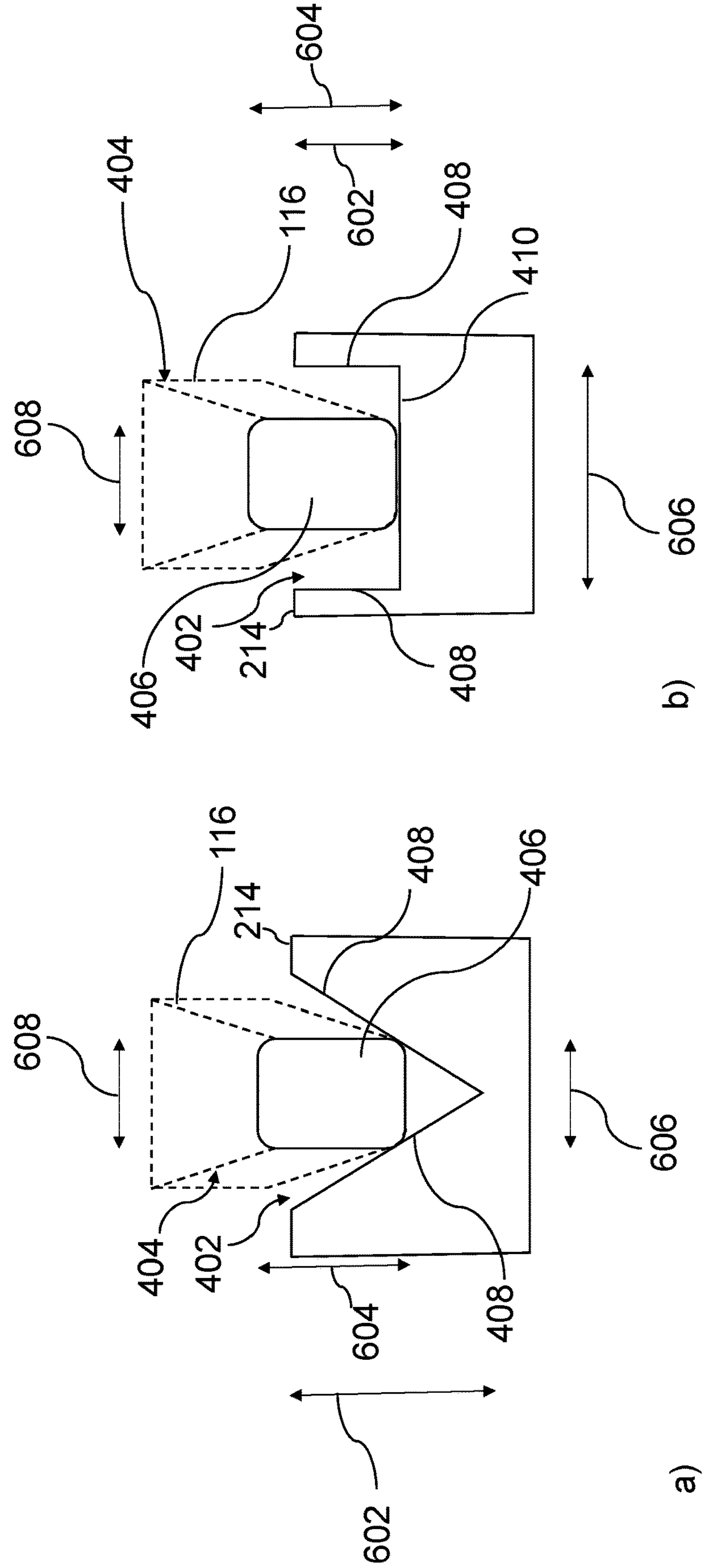
FIG. 7 schematically shows cross-sectional views of a surface depression of the hair cutting system of FIG. 3, according to two alternative embodiments of the invention.

As best illustrated in FIG. 7, which schematically shows cross-sectional views of alternative groove arrangements a) and b), the groove 402 comprises two side walls 408 which form two lateral sides of the groove 402 in the lateral direction parallel to the cutting edge 120 of the cutting head.

A guard tooth 116 is received in the space defined between the side walls 408 to engage the groove 402. The guard tooth 116 need not abut the side walls 408, such that some relative movement between the guard tooth 116 and the corresponding comb tooth 302 may be permitted, e.g. until the guard tooth 116 will abut one of the side walls 408 of the groove 402 and restrict or prevent further lateral movement of the comb tooth 302. In embodiments, however, relative movement between a guard tooth 116 and the corresponding comb groove 402 may be prohibited. The extent by which a comb tooth 302 is permitted to move relative to the guard tooth 116 will depend on, amongst other things, a lateral extent of the groove 402 relative to a thickness of the guard tooth 116. In that regard, the groove 402 may have a lateral extent 606 between the two side walls 408 that is equal to (FIG. 7*a*) a thickness 608 of the front surface 406 or tip of the guard tooth 116, such that the guard tooth 116 may be snugly received in the space between the side walls. The groove 402 may instead have a lateral extent 606 between the two side walls 408 that is greater than (FIG. 7*b*) a thickness 608 of the front surface 406 or tip of the guard tooth 116, to define a gap between the guard tooth and the side walls 408 when in the engaged stated. In that case, the comb tooth is allowed to move by a distance corresponding to the size of the gap, i.e., until one of the sides of the depression abuts the guard tooth to restrict or prevent further movement.

The extent of lateral restriction may be increased by providing a groove 402 that has a shape that conforms to the shape of the distal end 404 of the guard tooth 116. In embodiments such as that shown in FIG. 7, a thickness of the guard tooth 116 in the lateral direction tapers towards the distal end 404 of the guard tooth 116, and the groove 402 has a lateral extent 606 that tapers towards a bottom of the groove 42. Specifically, the side walls 408 may be angled to meet each other at the bottom of the groove 402, to define a V-shaped profile in cross-section, as shown in FIG. 7*a*.

In an alternative embodiment, such as that shown in FIG. 7*b*, the bottom of the groove 402 comprises a base 410 which defines, together with the side walls 408, a U-shaped profile in cross-section. In that case, the side walls 408 may be substantially vertical, although one or more of the side walls 408 may deviate from vertical. It will also be appreciated that although FIG. 7 shows the side walls 408 and base 410 being substantially linear (planar), this is not required.

The size of the grooves 402 relative that of the distal ends 404 of the guard teeth 116 may be tailored to set the amount by which the guard teeth 116 are received in the grooves 402. In the embodiments illustrated in FIG. 7, the groove 402 has a depth 602 such that at least 50% of the height 604 of the front surface 406 or tip is received within the space defined by the groove 402 and is beneath the remaining guide-facing surface 214 (i.e. the part of the guide-facing surface 214 that does not form an interior surface of the groove 402).

The outer profile of the guard-facing surface 214 and the comb tooth 302 together define, when engaged, a hair guiding interface comprising surfaces for directing hairs that are received between adjacent comb teeth 302 to the inner cutting member 110. Accordingly, by effectively sinking at least a part of the guide tooth 116 below the surrounding guard-facing surface 214, that part does not define the outer profile and is therefore prevented from forming part of a hair guiding interface. This may provide an improved arrangement in which the guard teeth 116 present less of an obstacle to hairs in the hair transport path through to the cutting edge 120.

Figure 8:
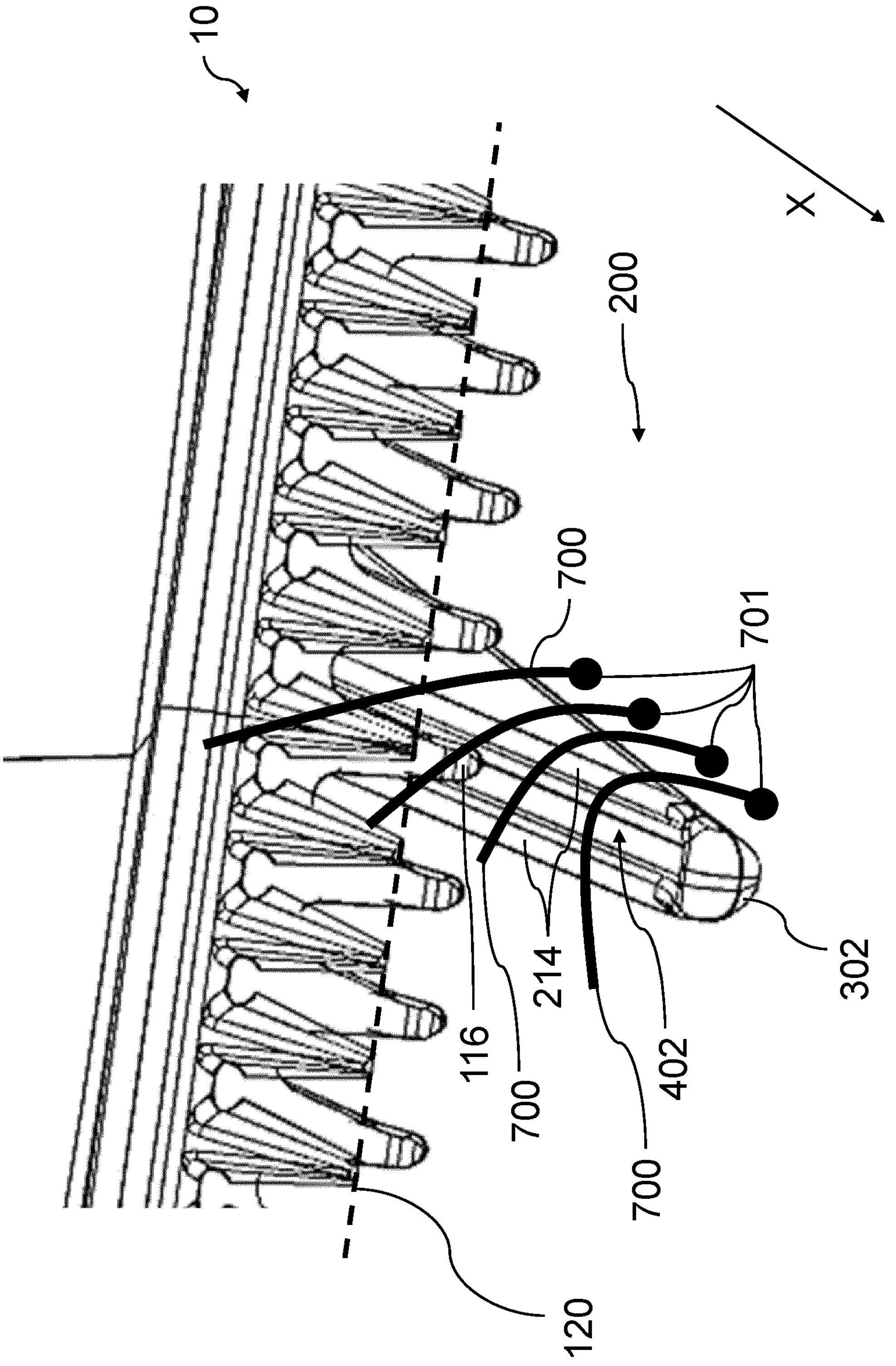
FIG. 8 is a simplified front perspective view of a part of the hair cutting system of FIG. 5, in use.

With reference to FIG. 8, as the system 10 is moved in the cutting direction x, hairs 700 are brought towards the comb 200 to be cut. The hairs 700 may be tangled and orientated randomly from their roots 701 on the surface of the skin (not shown). Therefore, as hairs 700 having roots 701 positioned adjacent a comb tooth 302 enter the comb 200 and are separated and untangled from hairs having roots positioned on a different side of the comb tooth 302, some of those hairs 700 may fall and lie across the guard-facing surface 214 at a location that is forwards of the guard teeth 116 in the cutting direction x. Those hairs 700 will then be lifted and guided towards the cutting edge 120 downstream of the comb tooth 302.

In conventional arrangements, the guard teeth 116 will lie on an upper or outer-most region of the guard-facing surface 214 and pose a barrier or step height that can collide with and prevent hairs that lie across the guard-facing surfaces 214 from being raised and guided to the cutting edge 120. This is exacerbated at long hair cutting length settings, similar to the fully extended position of FIG. 3*b*, at which the spacing between the cutting edge 120 and the rear facing surfaces 222 of the comb teeth 302 in the first direction 212 is increased, thereby exposing a larger area of the guard-facing surface 214. This problem decreases the number of hairs that are cut by the cutting element 104 despite having root positions that are between adjacent comb teeth 302. Further, even hairs that do overcome the obstacle posed by the guard teeth 116 may not be adequately raised before entering the cutting region. This is because hairs may be pushed away from the cutting region by the guard teeth 116 as they overcome the step-height. Such arrangements can therefore lead to an uneven and incorrect hair length end result which may differ for different strokes through the hair.

Accordingly, by receiving at least the distal end of a guard tooth 116 in the groove 402, the comb 200 will hide that section of the guard tooth 116 beneath the upper or outermost region of the guard-facing surface 214, and consequently the hairs 700 that fall onto the upper or outermost region of the guard-facing surface 214 at a location that is forwards of the guard tooth 116 in the cutting direction x. In this way, hairs 700 that fall onto the guard-facing surface 214 of the comb tooth 302 encounter a smaller step height to be overcome (and in some cases no step height at all) when they meet the guard teeth 116 during a cutting stroke through the hair. This may provide an improved arrangement in which the guard tooth 116 presents less of an obstacle to hairs in the hair transport path through to the cutting edge 120. The hair 700 may therefore be consistently and adequately manipulated to the desired orientation for being cut.

It will be appreciated that the above-described advantage can be realised as long as some of the guard tooth is received within the depression to hide a part of the guard tooth from the hair guiding interface. Therefore, less than 50% of the height of the front surface 406 may be received in the depression and thus hidden from the hair guiding interface. However, the more the guard tooth is received in the groove, the less of an obstacle the guard tooth will present to hairs travelling along the hair guiding interface.

Further, although the depression has been described above as being in the form of a groove, this is not required. The depression may have any shape or indeed size that is suitable for receiving and bounding a guard tooth.

Further, the comb tooth 302 may have a plurality of depressions arranged in side-by-side or end-to-end relationship along the longitudinal direction of the comb tooth 302, where each depression has a distinct longitudinal position away from the support body 300 of the second member 204. For example, each depression may have a distinct longitudinal position corresponding to a different hair cutting length of the comb 200. Adjacent depressions may be separated in the longitudinal direction by a ridge of comb material, the top of which may be coplanar with the remaining area of the guard-facing surface 214. The plurality of depressions may form alternating peaks and troughs in the longitudinal direction, where each depression is formed by a respective trough.

In the manner described above, the present invention may provide consistent and improved hair lifting and guidance, as well as increased robustness. While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A hair comb for attaching to a cutting head of a hair-cutting device, the cutting head having an inner cutting member and an outer guard member comprising a main body and a plurality of guard teeth extending from the main body in side-by-side relationship, wherein the hair comb comprises:

a support body for attachment to the cutting head; and a plurality of comb teeth that extend longitudinally from the support body in side-by-side relationship;

wherein at least one comb tooth of the plurality of comb teeth comprises:

a skin-contact surface and a guard-facing surface opposite the skin-contact surface, wherein the guard-facing surface has a depression which defines a space for receiving a distal end of a guard tooth when the hair comb is attached to the cutting head, wherein, when the hair comb is attached to the cutting head, the guard tooth and the at least one comb tooth have an outer profile which defines a hair guiding interface for directing hairs to the inner cutting member; and wherein the depression extends lengthwise in a longitudinal direction of the comb tooth such that the depression restricts lateral movement of the comb tooth with respect to the guard tooth when the hair comb is attached to the cutting head and/or such that the distal end of the guard tooth is prevented from forming part of a hair guiding interface.

2. A hair comb as claimed in claim 1, wherein the hair comb comprises:

a first member for fixed attachment to the cutting head; and a second member which comprises the support body and the plurality of comb teeth;

wherein the at least one comb tooth is wedge-shaped in that a height between the guard-facing surface and the skin-contact surface tapers towards a distal end of the at least one comb tooth from the support body; and wherein the second member is moveably connected to the first member to allow the comb teeth to translate with respect to the first member in a first direction;

whereby, in use, translation of the comb teeth in the first direction causes the distal end of the at least one comb tooth to move forwards of the guard teeth in a cutting direction to adjust a spacing between a skin of a user and the inner cutting member in order to define a hair cutting length.

3. A hair comb as claimed in claim 1, wherein the guard-facing surface has a depression comprising a groove.

4. A hair comb as claimed in claim 3, wherein the groove extends lengthwise in a longitudinal direction of the at least one comb tooth.

5. A hair-cutting system, comprising:

a hair-cutting device comprising a cutting head having an inner cutting member and an outer guard member, wherein the outer guard member comprises a main body and a plurality of guard teeth extending from the main body in side-by-side relationship; and a hair comb as claimed in claim 1;

wherein the hair comb is configured to cooperate with the cutting head such that, when the hair comb is attached to the cutting head:

at least a distal end of a guard tooth is received in the space defined by the depression on the guard-facing surface to engage the at least one comb tooth wherein, when the hair comb is attached to the cutting head, the guard tooth and the at least one comb tooth have an outer profile which defines a hair guiding interface for directing hairs to the inner cutting member; and wherein the depression extends lengthwise in a longitudinal direction of the comb tooth such that the depression restricts laterals movement of the comb tooth with respect to the guard tooth when the hair comb is attached to the cutting head and/or such that the distal end of the guard tooth is prevented from forming part of a hair guiding interface.

6. A hair-cutting system as claimed in claim 5, wherein:

the distal end of the guard tooth has a height which is defined between an inner surface and an outer surface of the guard member; and the depression has a depth such that, when the hair comb is attached to the cutting head, at least some of the height of the distal end is received in the space defined by the depression and is prevented from forming part of the hair guiding interface.

7. A hair-cutting system as claimed in claim 6, wherein the depression has a depth such that, when the hair comb is attached to the cutting head, at least 50% of the height of the distal end is received in the space defined by the depression and is prevented from forming part of the hair guiding interface.

8. A hair-cutting system as claimed in claim 5, wherein:

the depression has a lateral extent, in a direction along which the plurality of comb teeth are spaced apart, such that the guard tooth and the at least one comb tooth engage to restrict lateral movement of the comb tooth.

9. A hair-cutting system as claimed in claim 8, wherein the lateral extent of the depression is equal to a thickness of the guard tooth in the lateral direction.

10. A hair-cutting system as claimed in claim 5, wherein:

a thickness of the guard tooth in a lateral direction, along which the guard teeth are spaced apart, is tapered towards the distal end of the guard tooth; and a lateral extent of the depression tapers towards a bottom of the depression.

11. A hair-cutting system as claimed in claim 5, wherein the depression has a V-shaped profile in cross-section.

12. A hair-cutting system as claimed in claim 5, wherein the depression has a U-shaped profile in cross-section.

13. A hair-cutting system as claim 5, wherein:

the hair comb is configured to co-operate with the cutting head such that, when the hair comb is attached to the cutting head, at least the distal end of the guard tooth is inclined with respect to the guard-facing surface such that a distal tip of the guard tooth points towards the depression.

* * * * *